United States Patent
Gu et al.

(10) Patent No.: US 6,505,775 B1
(45) Date of Patent: Jan. 14, 2003

(54) PRODUCE DATA COLLECTOR WITH ENHANCED LVF SPECTROMETER

(75) Inventors: Yeming Gu, Suwanee, GA (US); Hong Tang, Suwanee, GA (US); Donald A. Collins, Jr., Snellville, GA (US); Rex A. Aleshire, Buford, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/558,013

(22) Filed: Apr. 25, 2000

(51) Int. Cl.[7] .................................................. G06K 7/10
(52) U.S. Cl. ..................... 235/454; 235/455; 235/462.11
(58) Field of Search ................................. 235/454, 455, 235/462.01, 462.25, 462.41, 462.11, 462.14

(56) References Cited

U.S. PATENT DOCUMENTS

| | | | |
|---|---|---|---|
| 4,693,330 A | 9/1987 | Uchimura et al. ............. 177/25 |
| 4,907,280 A | * 3/1990 | Barney et al. .................. 382/1 |
| 5,166,755 A | 11/1992 | Gat ............................. 356/419 |
| 5,546,475 A | 8/1996 | Bolle et al. ................... 382/190 |
| 5,844,681 A | * 12/1998 | Alessi et al. ................. 356/319 |
| 5,867,265 A | 2/1999 | Thomas ....................... 356/328 |
| 6,155,489 A | * 12/2000 | Collins, Jr. et al. ...... 235/462.01 |
| 6,313,917 B1 | * 11/2001 | Tang et al. .................. 356/402 |
| 6,332,573 B1 | * 12/2001 | Gu et al. ............... 235/462.06 |
| 6,431,446 B1 | * 8/2002 | Gu et al. ..................... 235/454 |

* cited by examiner

*Primary Examiner*—Daniel St. Cyr
(74) *Attorney, Agent, or Firm*—Paul W. Martin

(57) ABSTRACT

A produce data collector which includes a spectrometer which minimizes noise from scattered light and from wavelengths outside the operating range of the spectrometer. The produce data collector includes a light source for illuminating a produce item. The spectrometer obtains spectral information about the produce item in incoming reflected light from the produce item and includes a linear variable filter, a photodetector adjacent the linear variable filter, and an optical slit member above a primary surface of the linear variable filter which has a slit with a width sufficient to minimize scattering of the incoming light by interior surfaces of the linear variable filter. The produce data collector may additionally include a filter, such as an infrared filter.

14 Claims, 4 Drawing Sheets

PRODUCE DATA COLLECTOR WITH ENHANCED LVF SPECTROMETER

CROSS-REFERENCE TO RELATED APPLICATIONS

The present invention is related to the following commonly assigned and co-pending U.S. application:

"A Produce Data Collector And A Produce Recognition System", filed Nov. 10, 1998, invented by Gu, and having a Ser. No. 09/189,783.

BACKGROUND OF THE INVENTION

The present invention relates to product checkout devices and more specifically to a produce data collector including an enhanced linear variable filter (LVF) spectrometer.

Bar code readers are well known for their usefulness in retail checkout and inventory control. Bar code readers are capable of identifying and recording most items during a typical transaction since most items are labeled with bar codes.

Items which are typically not identified and recorded by a bar code reader are produce items, since produce items are typically not labeled with bar codes. Bar code readers may include a scale for weighing produce items to assist in determining the price of such items. But identification of produce items is still a task for the checkout operator, who must identify a produce item and then manually enter an item identification code. Operator identification methods are slow and inefficient because they typically involve a visual comparison of a produce item with pictures of produce items, or a lookup of text in table. Operator identification methods are also prone to error, on the order of fifteen percent.

A produce data collector which uses an active spectrometer is disclosed in the cited co-pending application. A produce item is placed over a window in the produce data collector, the produce item is illuminated, and the spectrum of the diffuse reflected light from the produce item is measured.

The spectrometer may include an LVF, which offers continuous spectral coverage within the visible wavelength range (400–700 nm). The LVF consists of a rectangular glass substrate and a filter coating on the glass substrate. The LVF is formed by vacuum depositing dielectric coating materials as multi-layer thin films onto the substrate. The thickness of the coating is uniform along one direction (small side or end) of the glass substrate but varies continuously along the perpendicular or wavelength direction (long side). Portions of the LVF representing desired wavelengths or wavelength ranges may be used for specific applications. In the produce data collector disclosed in the co-pending application, the LVF is placed on top of a linear detector array.

There are two important characterizations of the LVF, its resolution in terms of full-width-at-half-maximum (FWHM) and its spectral density. The spectral density measures how much the center wavelength changes per unit distance along the length of the LVF. A typical LVF, such as those manufactured by Optical Coating Laboratory, Inc., the FWHM is less than 2.5 percent of the wavelength and there are different spectral density values available, typically in the range of 30 to 60 nanometers per millimeter.

Due to its special manufacturing process, LVF is usually expensive. It is highly desirable to use portions of an LVF in applications. This causes a serious difficulty, the light scattered off the interior side walls of the glass substrate and the LVF housing generate serious optical noises that deteriorate the performance of the spectrometer. The problem exists as long as the whole top surface area of the LVF is illuminated, even if all incident rays are limited to within a very narrow acceptance cone by using an effective baffle system.

Since the interior side walls of the LVF substrate are in general not optically flat, an incident ray hitting these walls will be scattered and some of these scattered rays will pass through the filter coating with larger incident angles, which deteriorates the spectral performance of the filter in two ways, it reduces the resolution and it generates background noise in the spectrum.

Light outside the operation range of the LVF is also a problem. For example, infrared energy poses a particular problem. Infrared signal outside the wavelength range of the LVF will pass through at the corresponding half-wavelength band. For example, infrared signal at 800 nm will pass through the 400 nm band. Such infrared "leakage" may be treated as another type of noise and can be quite significant for many applications.

All these noise problems become very important when one tries to manufacture LVF/LDA spectrometers to narrow tolerances and high quality standards.

Therefore, it would be desirable to provide an LVF spectrometer which minimizes or eliminates the noise problems addressed above. It would also be desirable to provide a produce data collector which includes such an LVF spectrometer.

SUMMARY OF THE INVENTION

In accordance with the teachings of the present invention, a produce data collector including an enhanced linear variable filter (LVF) spectrometer is provided.

The produce data collector includes a light source for illuminating a produce item, a spectrometer to obtain spectral information about the produce item in incoming reflected light from the produce item, and control circuitry which produces digital signals from electrical signals produced by the spectrometer.

The spectrometer includes a linear variable filter which includes a primary surface and a number of interior surfaces and which splits incoming light reaching the primary surface into a number of light portions having different wavelengths, a photodetector adjacent the linear variable filter which samples the light portions and produces electrical signals containing information about each light portion, and an optical slit member above the primary surface of the linear variable filter which has a slit with a width sufficient to minimize scattering of the incoming light by the interior surfaces of the linear variable filter.

The optical slit member preferably also minimizes scattering of the incoming light by interior walls of a housing containing the LVF.

The spectrometer preferably also includes a filter which minimizes light within the incoming light which is outside a wavelength range of operation of the linear variable filter.

It is accordingly an object of the present invention to provide a produce data collector including an enhanced LVF spectrometer.

It is another object of the present invention to provide an LVF spectrometer which minimizes noise from scattered light.

It is another object of the present invention to provide an LVF spectrometer which minimizes noise from leakage of wavelengths, such as infrared wavelengths, outside the operating range of the LVF.

It is another object of the present invention to provide a produce data collector which uses an LVF spectrometer which is resistant to noise from scattered light, the FOV effect, and leakage.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
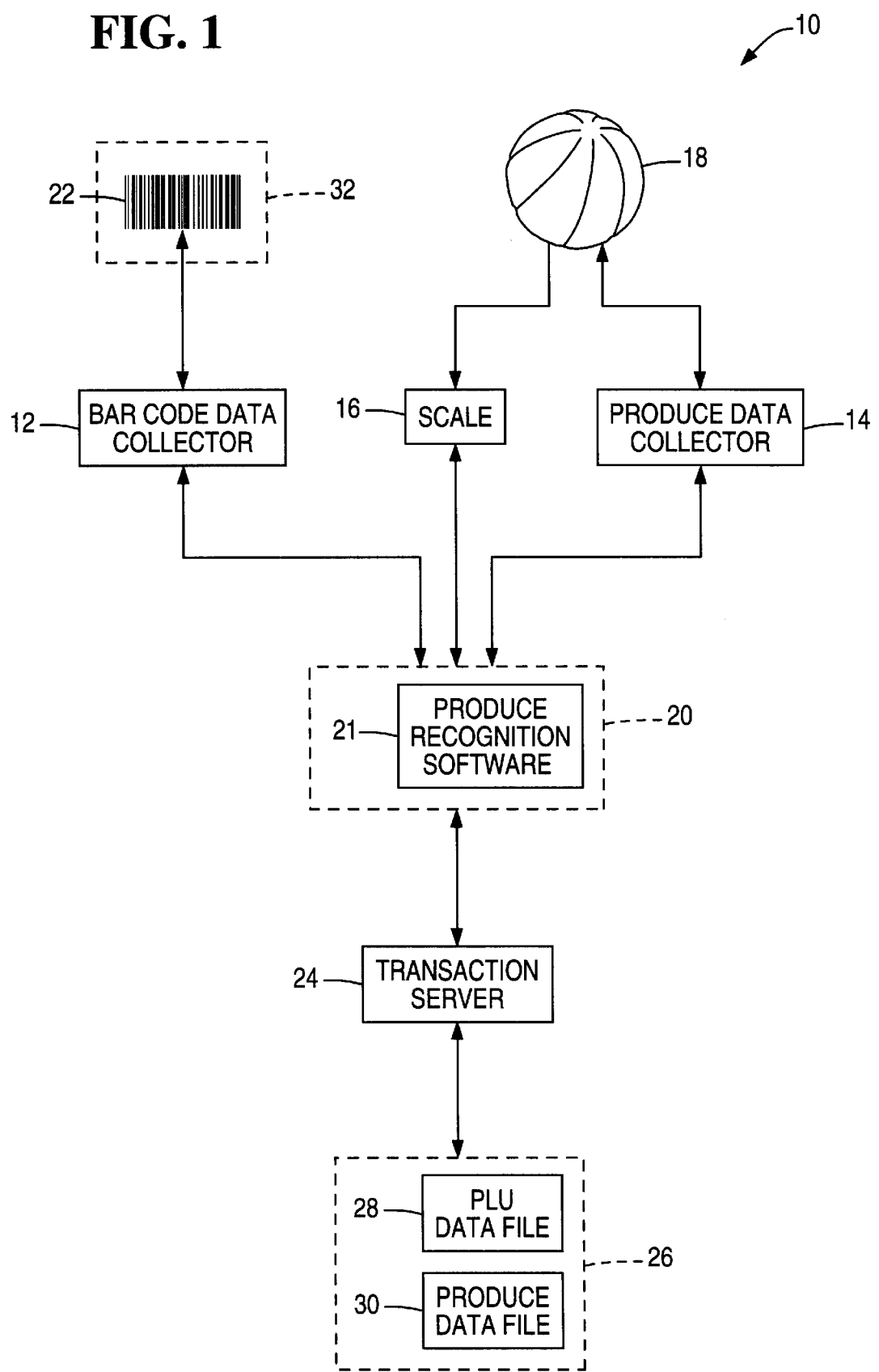
FIG. 1 is a block diagram of a transaction processing system including the produce data collector of the present invention.

Referring now to FIG. 1, transaction processing system 10 includes bar code data collector 12, produce data collector 14, and scale 16.

Bar code data collector 12 reads bar code 22 on merchandise item 32 to obtain an item identification number, also know as a price look-up (PLU) number, associated with item 32. Bar code data collector 12 may be any bar code data collector, including an optical bar code scanner which uses laser beams to read bar codes. Bar code data collector 12 may be located within a checkout counter or mounted on top of a checkout counter.

Produce data collector 14 collects data for produce item 18 or any other non-barcoded merchandise item. Such data may include color and color distribution data, size data, shape data, surface texture data, and aromatic data. Reference produce data is collected and stored within produce data file 30. During a transaction, operation of produce data collector 14 may be initiated automatically by sensing placement of produce item 18 on scale 16 or by sensing a drop in ambient light level. Operation of produce data collector 14 may also be initiated manually by operator-initiated commands from transaction terminal 20. Produce data collector 14 preferably includes a spectrometer.

Scale 16 determines a weight for produce item 18. Scale 16 works in connection with bar code data collector 12, but may be designed to operate and be mounted separately. Scale 16 sends weight information for produce item 18 to transaction terminal 20 so that transaction terminal 20 can determine a price for produce item 18 based upon the weight information.

Bar code data collector 12 and produce data collector 14 operate separately from each other, but may be integrated together. Bar code data collector 12 works in conjunction with transaction terminal 20 and transaction server 24.

In the case of bar coded items, transaction terminal 20 obtains the item identification number from bar code data collector 12 and retrieves a corresponding price from PLU data file 28 through transaction server 24.

In the case of non-bar coded produce items, transaction terminal 20 executes produce recognition software 21 which obtains produce characteristics from produce data collector 14, identifies produce item 18 by comparing produce data in produce data file 30 with collected produce data, retrieves an item identification number from produce data file 30 and a corresponding price from PLU data file 28.

In an alternative embodiment, identification of produce item 18 may be handled by transaction server 24. Transaction server 24 receives collected produce characteristics and compares them with produce data in produce data file 30. Following identification, transaction server 24 obtains a price for produce item 18 and forwards it to transaction terminal 20.

PLU data file 28 and produce data file 30 are stored within storage medium 26, but either may also be located instead at transaction terminal 20, or bar code data collector 12.

To assist in proper identification of produce items, produce recognition software 21 may additionally display candidate produce items for operator verification. Produce recognition software 21 preferably arranges the candidate produce items in terms of probability of match and displays them as text and/or color images on an operator display of transaction terminal 20. The operator may accept the most likely candidate returned by or override it with a different choice.

Figure 2:
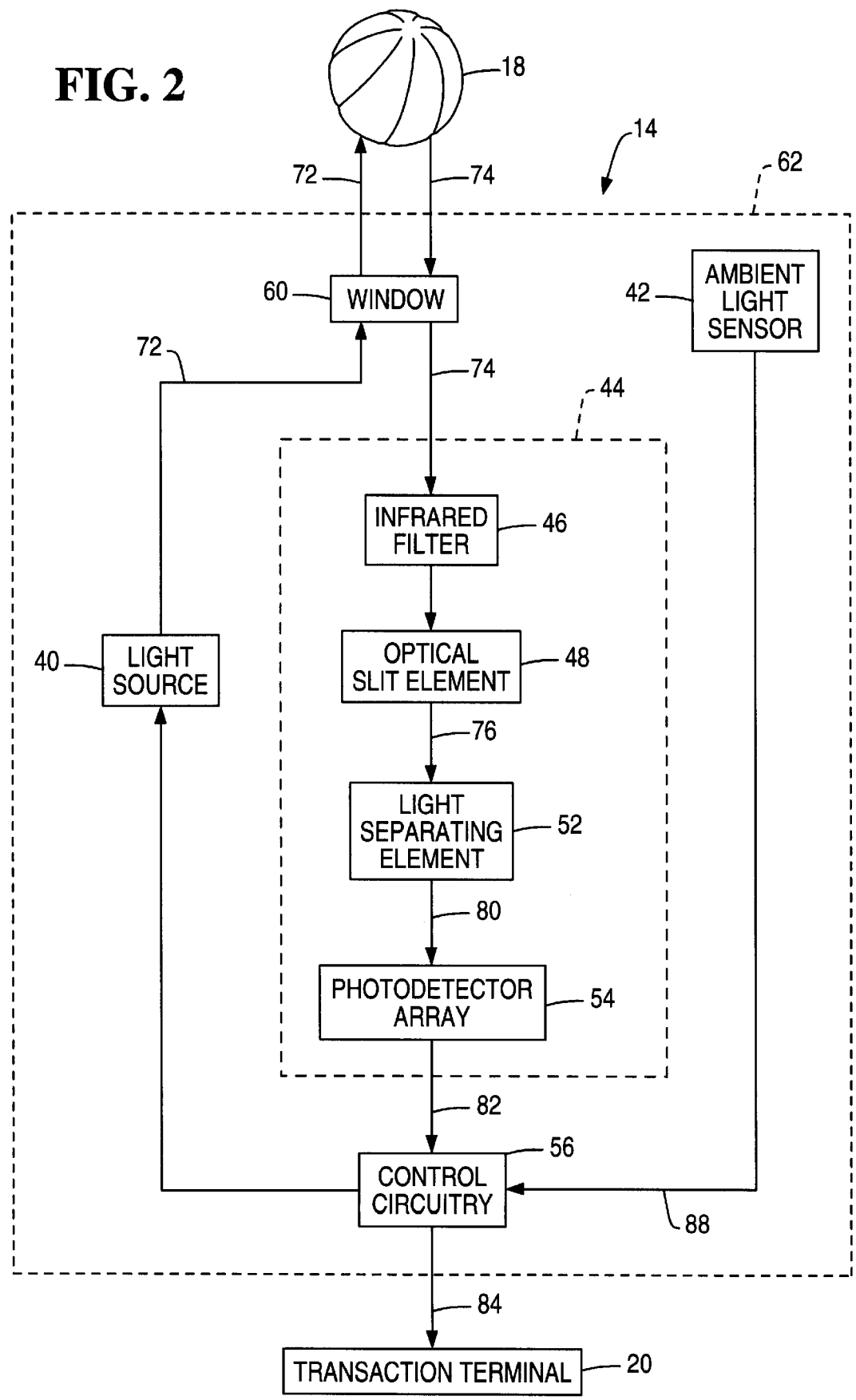
FIG. 2 is a block diagram of the produce data collector.

Turning now to FIG. 2, produce data collector 14 primarily includes light source 40, ambient light sensor 42, spectrometer 44, control circuitry 56, transparent window 60, and housing 62.

Light source 40 produces light 70. Light source 40 preferably produces a white light spectral distribution, and preferably has a range from four hundred 400 nm to 700 nm, which corresponds to the visible wavelength region of light.

Light source 40 preferably includes one or more light emitting diodes (LEDs). A broad-spectrum white light producing LED, such as the one manufactured by Nichia Chemical Industries, Ltd., is preferably employed because of its long life, low power consumption, fast turn-on time, low heat output, good directivity. The LEDs can be turned on and off very quickly, since it only takes less than two milliseconds for the LEDs to reach their stable output.

Ambient light sensor 42 senses the level of ambient light through window 60 and sends ambient light level signals 88 to control circuitry 56. Ambient light sensor 42 is mounted anywhere within a direct view of window 60. There may be multiple ambient light sensors.

Alternatively, the spectrometer 44 itself may be used as ambient light sensor. However a dedicated light sensor 42 will respond to ambient light changes much quicker than the spectrometer.

Spectrometer 44 includes filter 46, optical slit element 48, linear variable filter (LVF) 52 and linear detector array (LDA) 54.

Filter 46 minimizes noise from leakage by blocking light that is outside the wavelength range of LVF 52. Filter 46 may include an infrared filter, which is commonly referred to as a hot mirror.

Optical slit member 94 blocks off those rays of reflected light that might hit the sides of LVF 52 or the interior surfaces of the LDA housing.

LVF 52 splits filtered light 76 into light 80 of a continuous band of wavelengths. LVF 52 may be one manufactured by Optical Coating Laboratory, Inc.

LDA 54 produces waveform signals 82 containing spectral data. The pixels of the array spatially sample the continuous band of wavelengths produced by LVF 52, and produce a set of discrete signal levels. LDA 54 is preferably a complimentary metal oxide semiconductor (CMOS) array, but could be a Charge Coupled Device (CCD) array. The typical integration time of LDA 54 is anywhere between five and a few hundred milliseconds depending on the internal illumination level and the detector sensitivity, but is typically about fifty milliseconds.

Control circuitry 56 controls operation of produce data collector 14 and produces digitized produce data waveform signals 84. For this purpose, control circuitry 56 includes a processor, memory, and an analog-to-digital (A/D) converter. A twelve-bit A/D converter with a sampling rate of 22–44 kHz produces acceptable results.

Control circuitry 56 also receives signals from ambient light sensor 42. In response to ambient light level signals 88, control circuitry 56 waits for ambient light levels to fall to a minimum level (dark state) before turning on light source 40. Ambient light levels fall to a minimum level when produce item 18 covers window 60. After control circuitry 56 has received waveform signals 82 containing produce data, control circuitry 56 turns off light source 40 and waits for ambient light levels to increase before returning to waiting for the dark state. Ambient light levels increase after produce item 18 is removed from window 60.

Housing 62 contains light source 40, ambient light sensor 42, LVF 52, LDA 54, control circuitry 56, and window 60. When produce data collector 14 is mounted within the housing of a combination bar code reader and scale, window 60 may be located in a scale weigh plate instead.

Window 60 includes an anti-reflective surface coating to prevent light 72 reflected from window 60 from contaminating reflected light 74.

Housing 62 is approximately five and a half inches in length by two and three quarters inches in width by one and three quarters inches in height.

In operation, light source 40 is turned off during the wait or idle state. An operator places produce item 18 on window 60. Control circuitry 56 senses placement and turns on light source 40 and starts integration by LDA 54. LVF 52 separates reflected light 74 into different wavelengths to produce light 80 of a continuous band of wavelengths. LDA 54 produces waveform signals 82 containing produce data. Control circuitry 56 produces digitized produce data signals 84 which it sends to transaction terminal 20 for identification by produce recognition software 21. Control circuitry 56 turns off light source 40 and waits for the next produce item.

Transaction terminal 20 uses produce data in digitized produce data signals 84 to identify produce item 18. Here, produce data consists of digitized waveforms which transaction terminal 20 compares to a library of digitized waveforms stored within produce data file 30. After identification, transaction terminal 20 obtains a unit price from PLU data file 28 and a weight from scale 16 in order to calculate a total cost of produce item 18. Transaction terminal 20 enters the total cost into the transaction.

Figure 3:
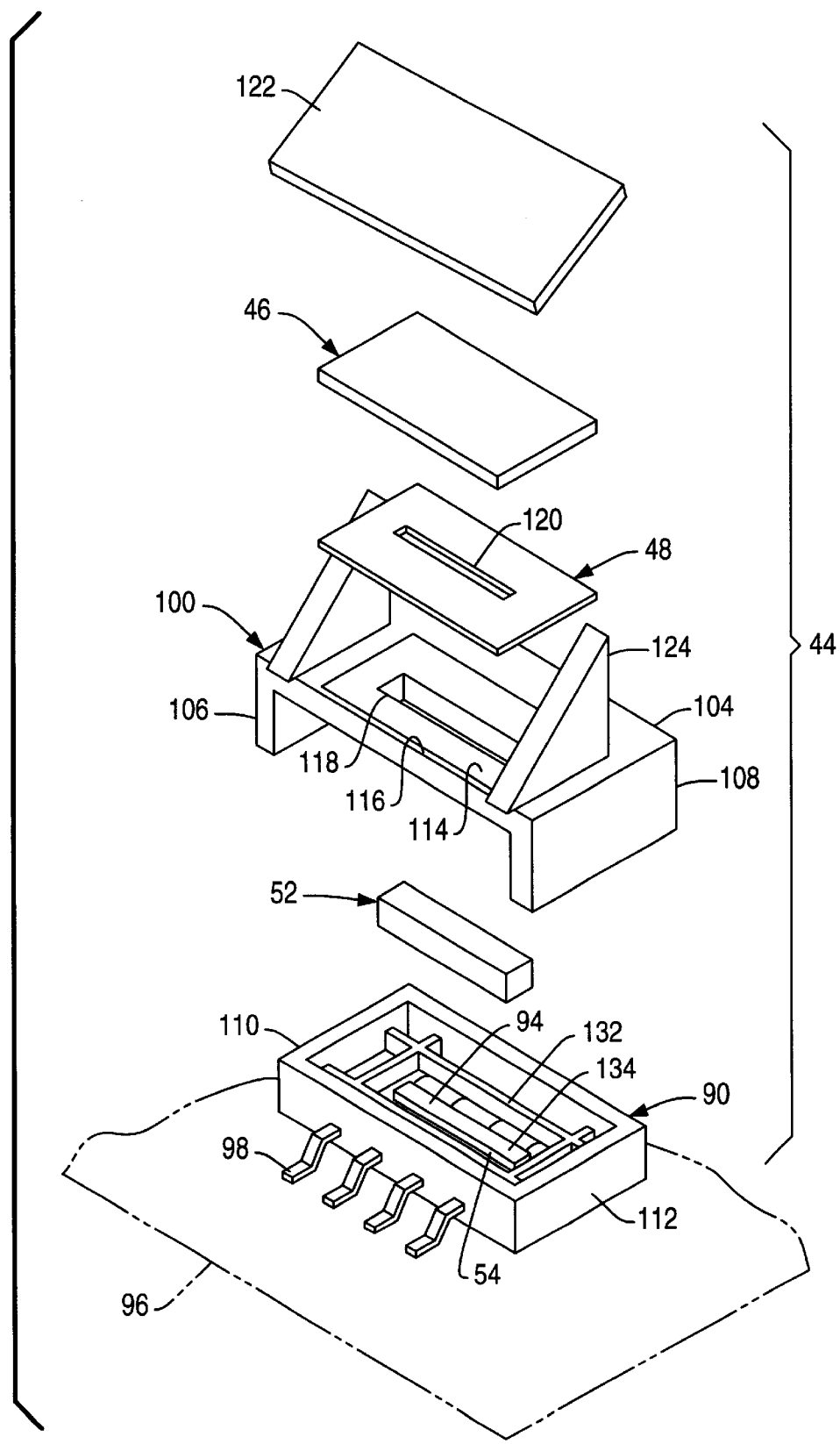
FIG. 3 is an exploded view of a spectrometer assembly.
Figure 4:
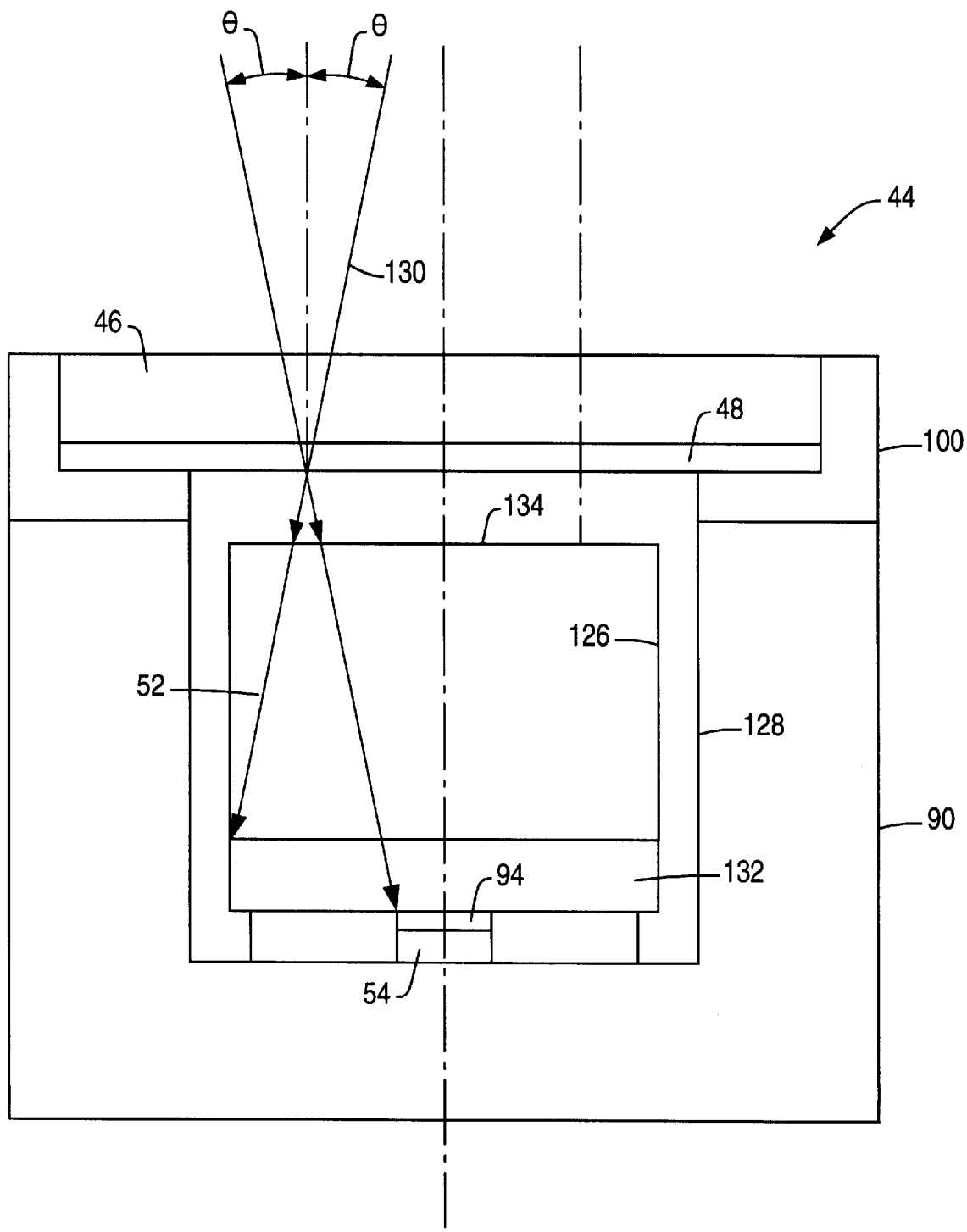
FIG. 4 is a cross-sectional view of the spectrometer assembly of FIG. 3.

Turning now to FIGS. 3 and 4, spectrometer 44 is shown in detail.

LDA housing 90 contains LDA 54. LDA protective window 94 is directly on top of LDA 54. Guard structure 132 surrounds LDA 54. Electrical connections to control circuitry 56 on printed circuit board 96 are made through terminal connections 98.

LVF 52 includes primary surface 134 which receives incoming light, and interior side surfaces 126. LVF 52 is placed on top of or as close as possible to LDA protective window 94. This placement eliminates or significantly reduces white-light leakage and optical noises due to multiple-reflections between LDA 54 and LVF 52.

LVF housing 100 includes a center portion 104 and wall portions 106 and 108.

Center portion 104 sits directly on LDA housing 90. Center portion 104 includes surface 114 which is indented below top surface 116. Within surface 114 is aperture 118.

Wall portions 106 and 108 are located adjacent to ends 110 and 112 of LDA housing 90.

Optical slit member 48 is located on surface 114 of center portion 104. Optical slit member 48 includes slit 120 over LVF 52. Slit 120 is wide enough so that it will not block any rays within acceptance cone 130 (FIG. 4) from reaching LDA 54, but also narrow enough so that no rays within the acceptance cone will hit the interior surfaces 126 of LVF 52.

FIG. 4 illustrates an ideal size LVF 52 corresponding to the acceptance cone angle of 2θ. For practical applications, slit 120 and LVF 52 need to be slightly wider to allow for mechanical tolerances. The proper range of slit width can be determined by simple geometric calculations for any given acceptance cone angle and the height of the slit above the surface of LVF 52. It is also determined by the mechanical tolerance of the relative positions of the relevant optical components (slit 48, LVF 52, and LDA 54).

Filter 46 is also located on top of optical slit member 48. Filter 46 also serves as a sealed window for the spectrometer assembly. Filter 46 may alternatively be located on LVF 52 as a hot-mirror coating, but this embodiment would be more expensive.

Routing mirror 122 may be necessary to route incoming reflected light to spectrometer 44. To accommodate mounting of routing mirror 122, center portion 104 of LVF housing 100 includes mirror support portions 124. Mirror support portions 124 orient mirror 122 at a forty-five degree angle, so that it can bend incoming reflected light ninety degrees.

Advantageously, optical slit element 48 minimizes or eliminates light scattering off of interior sides 126 of LVF 52 and interior side 128 of LDA housing 90.

Since noise and leakage are highly dependent on the details of the optical assembly, they will vary from device to device. Such device to device variation will significantly deteriorate the inter-device compatibility. Filter 46 and optical slit element 48 not only minimize or eliminate noise from scattered light, internal reflections, and infrared leakage, they also improve inter-device compatibility.

Although the invention has been described with particular reference to certain preferred embodiments thereof, variations and modifications of the present invention can be effected within the spirit and scope of the following claims.

We claim:

1. A spectrometer comprising:
   a linear variable filter which includes a primary surface and a number of interior surfaces, and which splits filtered incoming light reaching the primary surface into a number of light portions having different wavelengths;
   a photodetector adjacent the linear variable filter which samples the light portions and produces electrical signals containing information about each light portion;
   an optical slit member above the primary surface of the linear variable filter which has a slit with a width sufficient to minimize scattering of the incoming light by the interior surfaces of the linear variable filter; and
   a filter above the optical slit member which filters light within incoming light which is outside a wavelength range of operation of the linear variable filter to produce the filtered incoming light.

2. The spectrometer as recited in claim 1, further comprising:
- a housing having interior walls adjacent the linear variable filter;
- wherein the optical slit member also minimizes scattering of the incoming light by the interior walls of the housing.

3. The spectrometer as recited in claim 1, wherein the filter above the optical slit member comprises:
- an infrared filter which minimizes infrared light within the incoming light.

4. The spectrometer as recited in claim 1, further comprising:
- control circuitry which produces digital signals from the electrical signals.

5. The spectrometer as recited in claim 1, further comprising:
- a light source for illuminating an object to obtain spectral information about the object in incoming reflected light from the object.

6. The spectrometer as recited in claim 5, wherein the light source is a substantially white light source.

7. A produce data collector comprising:
- a light source for illuminating a produce item;
- a spectrometer to obtain spectral information about the produce item in incoming reflected light from the produce item including
  - a linear variable filter which includes a primary surface and a number of interior surfaces, and which splits filtered incoming light reaching the primary surface into a number of light portions having different wavelengths;
  - a photodetector adjacent the linear variable filter which samples the light portions and produces electrical signals containing information about each light portion;
  - an optical slit member above the primary surface of the linear variable filter which has a slit with a width sufficient to minimize scattering of the incoming light by the interior surfaces of the linear variable filter; and
  - a filter above the optical slit member which filters light within the incoming reflected light which is outside a wavelength range of operation of the linear variable filter to produce the filtered incoming light; and
- control circuitry which produces digital signals from the electrical signals.

8. A produce recognition system comprising:
- a produce data collector including
  - a light source for illuminating a produce item;
  - a linear variable filter which includes a primary surface and a number of interior surfaces, and which splits filtered incoming reflected light from the produce item reaching the primary surface into a number of light portions having different wavelengths;
  - a photodetector adjacent the linear variable filter which samples the light portions and produces electrical signals containing information about each light portion;
  - an optical slit member above the primary surface of the linear variable filter which has a slit with a width sufficient to minimize scattering of the incoming light by the interior surfaces of the linear variable filter; and
  - a filter above the optical slit member which filters light within incoming light which is outside a wavelength range of operation of the linear variable filter to produce the filtered incoming reflected light; and
  - control circuitry which produces digital spectral information about the produce item from the electrical signals; and
- a computer which compares the digital spectral information to reference spectra to identify the produce item.

9. A method of capturing spectral information about an item comprising the steps of:
- (a) filtering light within incoming light reflected from the item which is outside a wavelength range of operation of a linear variable filter;
- (b) receiving filtered incoming light through a primary surface of the linear variable filter;
- (c) minimizing scattering of the incoming light by interior surfaces of the linear variable filter by an optical slit member above the primary surface;
- (d) splitting incoming light into a number of light portions having different wavelengths by the linear variable filter; and
- (e) sampling the light portions by a photodetector to produce electrical signals containing information about each light portion.

10. A method of capturing spectral information about an item comprising the steps of:
- (a) filtering light within incoming light reflected from the item which is outside a wavelength range of operation of a linear variable filter;
- (b) receiving filtered incoming light through a primary surface of the linear variable filter;
- (c) minimizing scattering of the incoming light by interior surfaces of the linear variable filter and a housing containing the linear variable filter by an optical slit member above the primary surface;
- (d) splitting incoming light into a number of light portions having different wavelengths by the linear variable filter; and
- (e) sampling the light portions by a photodetector to produce electrical signals containing information about each light portion.

11. The method as recited in claim 10, wherein step
- (a) comprises the substep of:
  - (a-1) filtering infrared light.

12. The method as recited in claim 10, wherein the item comprises a produce item.

13. A method of capturing spectral information about a produce item comprising the steps of:
- (a) illuminating the produce item;
- (b) filtering incoming light reflected from the produce item;
- (c) receiving filtered incoming light through a primary surface of a linear variable filter;
- (d) minimizing scattering of the filtered incoming light by interior surfaces of the linear variable filter and a housing containing the linear variable filter by an optical slit member above the primary surface;
- (e) splitting the filtered incoming light into a number of light portions having different wavelengths by the. linear variable filter; and (f) sampling the light portions by a photodetector to produce electrical signals containing information about each light portion.

14. A method of identifying a produce item comprising the steps of:

(a) illuminating the produce item;

(b) filtering incoming light reflected from the produce item;

(c) receiving filtered incoming light through a primary surface of a linear variable filter;

(d) minimizing scattering of the filtered incoming light by interior surfaces of the linear variable filter and a housing containing the linear variable filter by an optical slit member above the primary surface;

(e) splitting the filtered incoming light into a number of light portions having different wavelengths by the linear variable filter;

(f) sampling the light portions by a photodetector to produce electrical signals containing information about each light portion;

(g) digitizing the electrical signals to produce a digital spectrum for the produce item; and (h) comparing the digital spectrum to reference spectra to identify the produce item.

* * * * *